METHOD OF MAKING CERMET RESISTORS BY ETCHING

Filed Nov. 27, 1964

INVENTORS
REINHARD GLANG
ARTHUR E. LESSOR JR.

BY Frederick D. Poag
ATTORNEY

United States Patent Office 3,398,032
Patented Aug. 20, 1968

3,398,032
METHOD OF MAKING CERMET
RESISTORS BY ETCHING

Reinhard Glang, Poughkeepsie, and Arthur E. Lessor, Jr., Owego, N.Y., assignors to International Business Machines Corporation, Armonk, N.Y., a corporation of New York Filed Nov. 27, 1964, Ser. No. 414,195
8 Claims. (Cl. 156—5)

ABSTRACT OF THE DISCLOSURE

A cermet resistor structure is built upon a silicon material base by depositing on the base a cermet formed by a chromium-silicon monoxide mixture, with the chromium ingredient being substantially more than 50 atomic percent of the mixture. A conductive film comprising copper with an admixture of chromium or aluminum is deposited over the cermet, and then portions of the conductor film are etched away by use of an etchant which attacks copper but does not substantially attack the admixed metal. Then, portions of the cermet are etched away by an etchant which attacks chromium but which does not substantially attack the silicon base material.

This invention relates to microcircuitry manufacture, and more particularly to a method for configuring cermet film resistors by the use of etching processes.

Deposited films of various kinds have been studied extensively during recent years for their potential usefulness in micro-electronic circuits. Among the most widely used film circuit elements are resistors. Evaporated Nichrome films, and sputtered and anodized tantalum films are useful as resistor elements, and more recently evaporated chromium-silicon monoxide film resistors have been recognized as having superior stability at higher temperatures and hence resistance to changes due to excessive load currents.

Nichrome and tantalum films can be configured by etching, but it has been customary to shape chromium-silicon monoxide cerment films by masking during the vacuum deposition process. Evaporation through masks as the sole means of governing the configuration of cermet resistors has certain disadvantages, particularly where exceedingly fine and tortuously configured geometries are required, for example for providing a rather high resistance value in a small space. In such cases, masks have the disadvantage that they are not only rather expensive to make but are limited in the fineness and geometric complexity which can be effected in a single mask while still maintaining reasonable mechanical strength and rigidity. Complicated shapes may require two or more depositions through different masks and therefore registration problems due to warpage, expansion and contraction of the masks become aggravated.

One of the desirable attributes of cermet films is their chemical stability, but this same quality is one which has militated against extension of etching techniques to the configuration of these elements in lieu of or in addition to masking techniques as above described. For example, one of the most frequently used cermets, chromium-silicon monoxide in a 50–50 atomic-molecular percent ratio has such a high silicon monoxide content that an etchant which would be a good choice for attacking the cermet, for example hydrofluoric acid, would also dissolve the silicon monoxide underlayer and the glass substrate normally employed in the insulating base upon which the resistor is deposited.

In accordance with the present invention, it has been found that if the metal ingredient of the metal-dielectric system of the cermet is made quite high, the cermet can be etched as if it consisted of the metal alone, even though the dielectric is present in sufficient quantity to yield desirable resistance and stability qualities for use as an electrical circuit element. Typically, this etchable cermet may comprise chromium and silicon monoxide wherein the chromium ingredient is at least about 70 atomic percent, and the etching technique is of the general kind applied in the dissolution of pure chromium films. Thus, the films are depassivated by contacting the surface with zinc pellets or powder, after which an aluminum chloride solution suitable for etching chromium is utilized to dissolve away the film. Even higher percentages of chromium, for example 90 atomic percent, can be employed in a cermet still having desirable properties for use as a resistor, and it has been found that such chromium-rich cermets are especially well adapted to the etching process of the invention. Since no hydrofluoric acid or the like which attacks silicon monoxide directly is utilized, there is no damage to the undercoat of silicon monoxide or to the glass or other siliceous substrate material of the insulating base.

In many applications, however, the aforedescribed etching method of the invention presents another problem. Often, a flash layer of the metal of the cermet is utilized to form an adhesive interface between the cermet and certain adjacent layers in a thin film laminate. For example, chromium may be provided over a chromium-silicon monoxide cermet resistance film in preparation to deposition of a copper conductor layer thereover. Later, it is desired to etch portions of the copper layer away so as to leave circuit configurations wherein the remaining copper forms connector or terminal means at opposite ends of a circuit path through the cermet material. In such cases, it is necessary or at least usually desirable to remove the chromium adhesive layer in the same areas in which the copper is removed. This is ordinarily accomplished by means of a chromium etch after the copper has been etched away. However, when chromium rich cermets are utilized for etchability in accordance with the present invention, the prior method of etching away a chromium underflash between the cermet and overlying conductor metal as aforedescribed becomes impracticable since the solvent used to remove the chromium also attacks the resistor film.

This problem is solved, in accordance with one aspect of the invention, by employing a mixture of the metal of the cermet and the metal of the conductor layer, in the above illustration chromium and copper, respectively, to provide an adhesive interface between the resistor and conductor films. Such an interface layer can be made rich in the metal of the conductor layer and still serve its function of providing good adhesion between the conductor layer and the cermet, and it has been found that such conductor metal-rich underflash portions are etchable by the etchant for the conductor, which is different from the etchant for the metal of the cermet. Accordingly, the adhesive interface layer can be removed without damage to the cermet.

Thus, it will be seen that, in accordance with the invention, one or more layers are etched by using a solvent for a material which is a constituent of the layer even though the layer contains other material which is resistant to the etchant. While the exact mechanics of operation in the etching process is not certain, it appears that what happens is that when one material, such as the chromium in the cermet or the copper in the adhesive interface layer, is dissolved away, the other material, such as the silicon monoxide in the cermet or the chromium in the adhesive layer is left unsupported and is washed away. Accordingly, a flexibility in the choice of etchants is provided whereby, for example, cermet resistor material can be etched without damage to surrounding insulator and substrate layers, and whereby other metal systems adjacent to the cermet and containing one of the metals of the cermet, such as the copper-chrome adhesive layer, can be etched without damage to the cermet even though the cermet contains one of the elements of that adhesive layer.

Alternatively, a third metal, such as aluminum, can be employed in the adhesive layer in place of chromium so as to be etchable without damage to the cermet. Accordingly, in a broad aspect, the invention contemplates use of an adhesive layer which comprises a material which is etchable in the adhesive layer but which is absent or otherwise unattackable in the cement or other film layer adjacent thereto.

Accordingly, it is an object of the present invention to provide an improved method of configuring film circuitry party by employment of etching operations.

It is another object of the invention to provide an improved method of manufacture of cermet resistors.

It is a further object of the invention to provide materials and means for configuring resistors by etching as aforesaid, whereby desired differentiation in the etching of plural adjacent materials is maintained.

It is yet another object of the invention to provide, in a method as aforesaid, conductor films which are adherent to resistor films as aforesaid and yet may be etched selectively with respect thereto.

It is still another object of the invention to provide a method of thin film cermet resistor production which affords cost advantages, greater pattern density capability, better pattern definition, and a wider range of resistance values compared to the corresponding attributes available through the use of prior art techniques.

The foregoing and other objects, features and advantages of the invention will be apparent from the following, more particular description of a preferred embodiment of the invention, as illustrated in the accompanying drawing.

Figures 1, 2, 3, 4, 5, 6, 7:
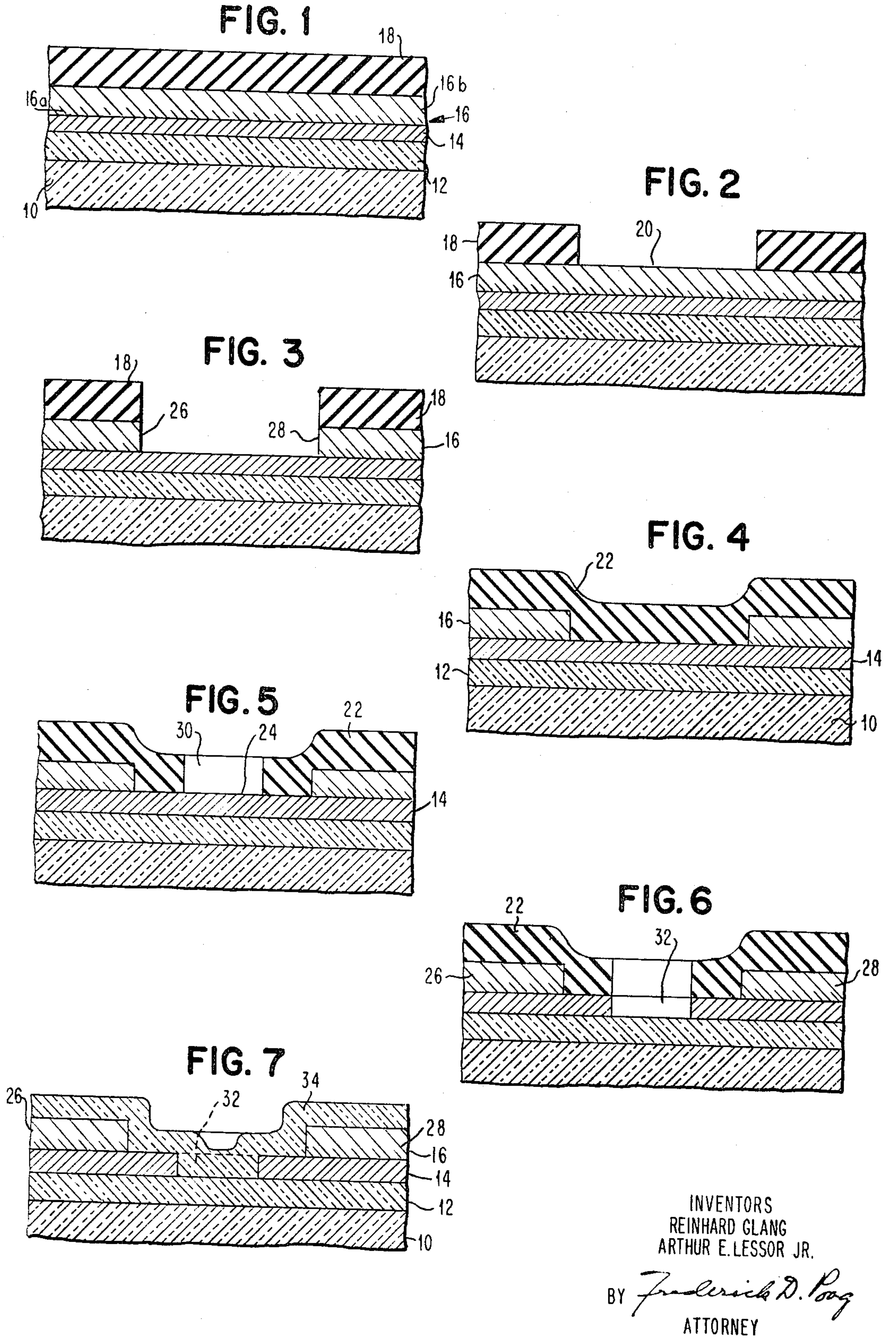
FIG. 1 is a fragmentary cross-sectional view, showing schematically a number of layers of different materials in a work piece prepared for configuration in accordance with the invention.
FIG. 2 is a view of the same after a top, photo resist, layer has been exposed and developed to take on a desired pattern.
FIG. 3 is a view of the same after a metallic layer has been etched in a pattern determined by the developed photo resist layer.
FIG. 4 shows the same after a new, undeveloped layer of photo resist has been applied.
FIG. 5 shows the same after the new layer of photo resist has been exposed and developed in accordance with a desired pattern.
FIG. 6 shows the structure of FIG. 5 after a cermet resistor layer therein has been etched away in accordance with a pattern defined by the photo resist thereover.
FIG. 7 is illustrative of the completed product piece after a protective outer coating has been applied.

As set forth above, one problem which had to be solved in order to provide a feasible process for etching metal-dielectric cermet resistors, particularly chromium-silicon monoxide cermet resistors, was to find a composition such that the resistor films could be etched in solvents other than hydrofluoric acid or similar material which attack the adjacent layers of the structure. Secondly it was necessary to find a conductor film which would adhere firmly to the resistor film in all phases of the etching and subsequent cleaning operations and yet be soluble in an etchant which leaves the resistor film unattacked.

It has been found that resistor films made by flash evaporation of a pre-mixed 90 at. percent Cr-10 mo. percent SiO powder dissolved readily in a solution consisting of one lb. $AlCl_3 \cdot 6H_2O$, 135 g. $ZnCl_2$, 30 ml. phosphoric acid ($H_3PO_4$) and 400 ml. of water. As in the case of etching pure chromium films, the resistor film is first depassivated by contacting its surface with zinc pellets or powder. If the same solvent is applied to films made from 70 atomic percent chromium-30 molecular percent silicon monoxide powder, the process of this solution is very slow and leaves islands of film as residues on the supporting surface. Accordingly, it appears that a practical lower limit of chromium concentration in the cermet film is about 70 atomic percent.

The adhesion of a pure copper film to the freshly prepared resistor film is poor. If an underflash of chromium is used to improve adhesion, a difficulty arises in that the solvent used to remove chromium also attacks the resistor film. Another method to increase the adhesion of copper films to various surfaces is the simultaneous evaporation of chromium and copper. However, chromium-rich copper alloys are not soluble in ferric chloride solution, the agent used to selectively remove excess areas of the copper film. It has been found that by evaporating Cr at a rate of about 3 A./sec. and Cu at 25 A./sec simultaneously, an alloy film is formed which is still soluble in ferric chloride solution and yet firmly adherent to the resistor film underneath. The same behavior can be obtained by substituting aluminum for chromium in the alloy.

The 90 Cr-10SiO mixture has been evaporated to yield sheet resistances of 40–50 ohms per square. By varying the film thickness, a wider range can be produced. In contrast to resistor films made from 50 Cr-50 SiO mixtures, the film restivity does not change much as the result of subsequent annealing. Several hours of heating in argon-hydrogen up to 450° C. produce a resistance decrease of not more than 20% of the original value. After this treatment, the resistance value is very stable.

One preferred example of a process in accordance with the invention comprising the following steps, FIG. 1 of the drawing applying to steps First through Fifth, and the other figures applying to subsequent steps as indicated:

*First.*—A heat resistant glass substrate 10, 2.5" x 3.5" x .040", with one side polished is ultrasonically cleaned in water and methanol baths.

*Second.*—A silicon monoxide undercoat 12, 5,000 to 15,000 A. thick, is evaporated in vacuum over the entire substrate surface at about 350° C.

*Third.*—The resistor film 14 is formed by flash evaporation in vacuum of a 90 atomic percent Cr-10 molecular percent SiO powder mixture. The film is condensed over the entire substrate surface, which is kept at a temperature of about 200° C. The sheet resistance of the growing film is monitored on a separate slide with metal contacts, and evaporation discontinued when a value of about 45 ohms per square is reached. The thickness of this cermet resistance film may be, for example, about 1200 A.

*Fourth.*—The substrate is transferred into another vacuum chamber to deposit a metal film 16 also over the entire surface. For this step, chromium and copper sources are adjusted to yield deposition rates of 3 and 25 A./sec., respectively. After about 30 seconds, the chromium evaporation is discontinued, whereas copper is further evaporated up to a total film thickness of about 10,000 A. Thus the layer 16 in reality comprises two portions, an alloy sublayer **16*a* and a copper body layer 16*b***.

*Fifth.*—The film panel is coated with photo resist 18 and cured at 100° C. The work piece assembly at this stage is as shown in FIG. 1.

*Sixth.*—A photographic plate with the resistor land and interconnection pattern is applied to the coated film panel and exposed with an arc lamp. After developing the pattern, the bared copper areas (20, FIG. 2) are dissolved in ferric chloride solution (FIG. 3). As shown in the drawing, this step effects removal of not only the copper **16*b* but the alloy 16*a*** as well.

*Seventh.*—The cured photo resist 18 is stripped off. and the surface is cleaned thoroughly, following which another photo resist film (22, FIG. 4) is applied to the surface and cured as before.

*Eighth.*—A photographic plate with the resistor pattern is then registered to the panel and exposed. After developing, the bared areas (24, FIG. 5) of the Cr-SiO resistor film are dissolved in the $AlCl_3$ solution above-described. Whereas the photo resist pattern of FIG. 2 served to pattern the dissolution of portions of the layer 16 for severing the same into two terminal portions (26, 28, FIG. 3), the photo resist pattern of FIG. 5 is designed, as indicated at 30 in that figure, to mark out for removal areas 24 of the resistor layer which will leave a tortuous but continuous path (32, FIG. 6) therein between the two cooperative terminal parts 26, 28.

*Ninth.*—The photo resist 22 is stripped off, and the panel is cleaned thoroughly in water and methanol, using ultrasonic agitation.

*Tenth.*—An SiO film (34, FIG. 7) 10,000–15,000 A. thick is vacuum deposited at 350° C. substrate temperature to cover all resistor areas.

*Eleventh.*—The resistance values are measured.

*Twelfth.*—While one of the resistors on the panel is being monitored, the substrate is annealed in argon-hydrogen for one to six hours at temperatures between 400 and 450° C. Exact annealing times and temperatures are determined from the resistance value of the monitored resistor.

*Thirteenth.*—All resistance values are measured again. If closer resistance tolerances are desired, individual resistor trimming by local heating can be utilized, a step which, per se, forms no part of the present invention.

Examples of resistors made by the above process on one substrate are as follows:

TABLE I

| Nominal resistor value (Ω) | Number of resistors | Resistor dimensions: Width (mils) | Resistor dimensions: Length (mils) | Ratio length/width |
|---|---|---|---|---|
| 20 | 10 | 20 | 10 | 0.50 |
| 33 | 80 | 12 | 10 | 0.83 |
| 66 | 12 | 12 | 20 | 1.67 |
| 100 | 48 | 12 | 30 | 2.50 |
| 6,800 | 10 | 5 | 850 | 170 |

The following Table II shows the average, high and low resistors in each category, prior to and after annealing, on a typical panel:

TABLE II

| Nominal resistor value (Ω) | Pre-anneal values | | | Post-anneal values | | |
|---|---|---|---|---|---|---|
| | Average | (Ω) High | Low | Average | (Ω) High | Low |
| 20 | 22.9 | 25.5 | 21.3 | 19.4 | 21.8 | 18.0 |
| 33 | 38.0 | 42.3 | 34.8 | 32.3 | 36.0 | 29.5 |
| 66 | 77.1 | 87.0 | 72.0 | 65.0 | 68.3 | 60.1 |
| 100 | 117.6 | 123.5 | 111.6 | 99.3 | 103.9 | 94.4 |
| 6,800 | 7,824 | 8,192 | 7,435 | 6,643 | 6,955 | 6,324 |

Table II shows that the average resistance values have been reduced by about 15% in all categories as the result of annealing. Individual trimming was applied to only one resistor, which, after the oven annealing, was trimmed down from 73.7 to 68.3 ohms by local heating. The final values are all within ±10% of the nominal values. The final average values are the closer to the nominal value, and the spreads are the narrower, the higher the desired resistor values are. This means that the accuracy in obtaining specified values is the better the larger the length-to-width ratio. This reflects the precision that can be obtained in defining resistor areas by photographic masks and etch processes. Table III shows the deviation of the post-anneal average values from the nominal values, and the spreads in each category:

TABLE III

| Nominal resistor value (Ω) | Post-anneal values (percent): Deviation of average | Post-anneal values (percent): Total spread |
|---|---|---|
| 20 | −3.0 | 19.6 |
| 33 | −2.0 | 20.1 |
| 66 | −1.5 | 12.4 |
| 100 | −0.7 | 9.6 |
| 6,800 | −2.4 | 9.5 |

The relatively large deviation of −2.4% from the specified 6,800 ohm value is due to the particular shape of these resistors; they are meandering lines, and it is difficult to calculate the length-to-width ratio of the bends and corners accurately.

These data indicate that large numbers of precision resistors with tolerances smaller than ±5% can be made by this process if great care is applied to the fabrication and dimensional control at the photographic artwork and if resistor dimensions are properly chosen. The ratio of resistor values shown in the tables is 340:1, which is by no means the upper limit.

As mentioned above, it has been found that aluminum can be substituted for the chromium in the alloy layer 16*a*. The ferric chloride which dissolves the copper body layer 16*b* will attach this copper-rich copper-aluminum alloy as well, so as to achieve a result similar to that obtained with the Cu-Cr alloy. Pure aluminum could be used for the layer 16*a*, and this could be etched by sodium hydroxide without damage to the Cr-SiO cermet below. However, in many cases the copper body 16*a* would be desired anyway, for ease of soldering and so, for simplicity in the etching process, the alloying of the aluminum with copper would be preferred over using unalloyed aluminum. In any case, however, it will be observed that means are provided for etching each of the cermet (14) and the conductor (16) layers differentially with respect to the exposed adjacent layer (12 or 14, respectively).

From the foregoing it will be seen that, in a broad aspect, the invention teaches the employment of mixture systems in one or more layers of a thin film laminate whereby a given layer can be etched by a solvent for a single member of the mixture system of that layer, where one or more other members of that system cannot be attacked directly without injury to adjacent parts. While a particular etching process employing an aluminum chloride solution and a specific chromium-rich cermet has been set forth in detail, it should be understood that the basic approach to etching cermets taught by the invention may be variously embodied. This approach is to attack the metal, not the dielectric, of the cermet so as to leave the dielectric unsupported even though it was never itself dissolved. Of course, the practical lower limit of the metal ingredient will vary according to the activity of the solvent chosen. In any event, the cermet should be rich enough in the metal ingredient for the latter to be attackable by the solvent, and, when the metal is dissolved away, for the dielectric to be left so unsupported as to be easily removable, as by washing. This washing may be by the etchant bath itself, or by more vigorous measures such as by swabbing and/or by the ultrasonic agitation of the "Ninth" step of the process set forth above.

Thus, while the invention has been particularly shown and described with reference to preferred embodiments thereof, it will be understood by those skilled in the art that various changes in form and details may be made therein without departing from the spirit and scope of the invention.

We claim:

1. The method of manufacture of thin film resistors which comprises the steps of:

providing a relatively insulating base which is inert to selective etchants, depositing on said base a film of cermet resistor material comprising metal and dielectric, wherein said cermet is sufficiently rich in said metal that the metal is attackable in the cermet by an etchant for said metal which does not substantially attack said dielectric, and selectively etching away portions of said cermet film by utilizing said etchant to dissolve said metal so as to weaken said cermet, and mechanically removing the weakened parts of said cermet.

2. The method in accordance with claim 1, wherein the mechanical removal of said weakened parts of said cermet is by washing.

3. The method in accordance with claim 1, wherein said metal is chromium and said dielectric is silicon monoxide.

4. The method in accordance with claim 3, wherein said chromium comprises substantially more than fifty atomic percent of said cermet, and wherein said base comprises silicon material.

5. The method of manufacture of thin film resistors which comprises the steps of:

providing an insulating base comprising a silicon material, depositing on said base a film of cermet resistor material comprising chromium and silicon monoxide, wherein said chromium comprises substantially more than fifty atomic percent of said cermet, depositing on said film of cermet a conductor film, said conductor film comprising copper with an admixture of metal selected from the group consisting of chromium and aluminum at least in the portion of said conductor film forming an interface with said cermet film, selectively etching away portions of said conductor film to expose part of said cermet film, utilizing an etchant which attacks copper but does not substantially attack said admixed metal and selectively etching away portions of said part of said cermet film, utilizing an etchant which attacks chromium but which does not substantially attack said silicon material.

6. The method of manufacture of thin film resistors which comprises the steps of:

providing an insulating base comprising a silicon material, depositing on said base a film of cermet resistor material comprising chromium and silicon monoxide, wherein said chromium comprises at least about seventy atomic percent of said cermet.

depositing on said film of cermet a conductor film, said conductor film comprising copper with an admixture of about twelve percent by volume of chromium at least in the portion of said conductor film forming an interface with said cermet film, selectively etching away portions of said conductor film to expose part of said cermet film, utilizing an etchant which attacks copper but does not substantially attack chromium, and selectively etching away portions of said part of said cermet film, utilizing an etchant which attacks chromium but which does not substantially attack either copper or said silicon material.

7. The method of manufacture of thin film resistors which comprises the steps of:

providing an insulating base comprising a silicon material, depositing on said base a film of cermet resistor material comprising chromium and silicon monoxide, wherein said chromium comprises about ninety atomic percent of said cermet.

depositing on said film of cermet a conductor film, said conductor film comprising copper with an admixture of about twelve percent by volume of chromium at least in the portion of said conductor film forming an interface with said cermet film, selectively etching away portions of said conductor film to expose part of said cermet film, utilizing an etchant which attacks copper but does not substantially attack chromium, and selectively etching away portions of said part of said cermet film, utilizing an etchant which attacks chromium but which does not substantially attack either copper or said silicon material.

8. The method of manufacture of thin film resistors which comprises the steps of:

providing an insulating base comprising a silicon material, depositing on said base a film of cermet resistor material comprising chromium and silicon monoxide, wherein said chromium comprises substantially more than fifty atomic percent of said cermet, depositing on said film of cermet a conductor film, said conductor film comprising copper, selectively etching away portions of said conductor film to expose part of said cermet film, utilizing an etchant which attacks copper but does not substantially attack chromium, and selectively etching away portions of said part of said cermet film, utilizing an etchant which attacks chromium but which does not substantially attack said silicon material.

References Cited

UNITED STATES PATENTS 3,135,638 6/1964 Cheney et al. ---------- 156—11

JACOB H. STEINBERG, *Primary Examiner.*